United States Patent
Lim et al.

(10) Patent No.: US 12,447,870 B2
(45) Date of Patent: Oct. 21, 2025

(54) APPARATUS FOR OPERATING SEAT

(71) Applicant: Hyundai Transys Inc., Seosan-si (KR)

(72) Inventors: Heoung Su Lim, Hwaseong-si (KR); Cheon Kim, Hwaseong-si (KR); Kyeong Ho Seo, Hwaseong-si (KR); Seongjun Hwang, Hwaseong-si (KR)

(73) Assignee: Hyundai Transys Inc., Seosan-si (KR)

( * ) Notice: Subject to any disclaimer, the term of this patent is extended or adjusted under 35 U.S.C. 154(b) by 180 days.

(21) Appl. No.: 18/470,685

(22) Filed: Sep. 20, 2023

(65) Prior Publication Data
US 2024/0174135 A1 May 30, 2024

(30) Foreign Application Priority Data

Nov. 28, 2022 (KR) .................. 10-2022-0161847

(51) Int. Cl.
*B60N 2/06* (2006.01)
*B60N 2/02* (2006.01)

(52) U.S. Cl.
CPC ......... *B60N 2/067* (2013.01); *B60N 2/02253* (2023.08)

(58) Field of Classification Search
CPC ............................ B60N 2/067; B60N 2/02253
See application file for complete search history.

(56) References Cited

U.S. PATENT DOCUMENTS

| | | | | |
|---|---|---|---|---|
| 5,934,755 | A * | 8/1999 | Halamish | B60N 2/818 297/391 |
| 7,665,704 | B2 * | 2/2010 | Koumura | B60N 2/0843 297/344.1 |
| 8,226,063 | B2 * | 7/2012 | Weber | B60N 2/067 297/344.1 |
| 10,369,901 | B2 * | 8/2019 | Murakami | B60N 2/07 |
| 2004/0145228 | A1 * | 7/2004 | Terrand | B60N 2/815 297/410 |
| 2019/0009693 | A1 * | 1/2019 | Angerer | F16H 25/20 |
| 2022/0234477 | A1 * | 7/2022 | Imamura | B60N 2/067 |
| 2022/0396179 | A1 * | 12/2022 | Zhao | B60N 2/2818 |

FOREIGN PATENT DOCUMENTS

| | | |
|---|---|---|
| DE | 19944690 B4 | 4/2000 |
| DE | 102018206261 A1 | 10/2018 |
| DE | 102017218492 A1 | 2/2019 |
| DE | 102018204263 A1 | 9/2019 |
| DE | 102020202523 A1 | 9/2021 |
| KR | 20-2000-0020897 U | 12/2000 |
| KR | 10-2010-0045825 A | 5/2010 |
| KR | 10-1725411 B1 | 4/2017 |

OTHER PUBLICATIONS

Schnock, "Office Action for DE Application No. 102023133026.8", Jan. 29, 2024, DPMA, Germany.

* cited by examiner

*Primary Examiner* — Philip F Gabler
(74) *Attorney, Agent, or Firm* — Bridgeway IP Law Group, PLLC; Jihun Kim

(57) ABSTRACT

An apparatus for operating a seat includes a lead screw, in which two opposite ends of a lead screw are rotatably supported by first and second brackets in a movable rail.

7 Claims, 10 Drawing Sheets

1

APPARATUS FOR OPERATING SEAT

CROSS-REFERENCE TO RELATED APPLICATIONS

This application claims priority to and the benefit of Korean Patent Application No. 10-2022-0161847 filed in the Korean Intellectual Property Office on Nov. 28, 2022, the entire contents of which are incorporated herein by reference.

TECHNICAL FIELD

The present invention relates to an apparatus for operating a seat that slides a vehicle seat forward or rearward.

BACKGROUND ART

In general, a vehicle seat may be slid forward or rearward by an apparatus for operating a seat. The apparatus for operating a seat includes a stationary rail installed on a floor panel of a vehicle, and a movable rail connected to a seat and configured to be movable in a length direction.

In the apparatus for operating a seat, a lead screw may be provided in the movable rail and disposed in the length direction of the movable rail, and a gearbox may be coupled to a front end of the lead screw. The gearbox may be connected to an electric motor and receive power from the electric motor.

The gearbox includes a worm wheel installed coaxially with the lead screw and coupled to the lead screw so as to be able to transmit power to the lead screw, and a worm shaft coupled to a motor shaft and configured to perpendicularly engage with the worm wheel.

The apparatus for operating a seat in the related art has a structure in which the lead screw is connected to the movable rail, and the lead screw moves together with the movable rail. However, because the apparatus for operating a seat in the related art has a cantilevered beam support structure in which only one end of the lead screw is supported, noise occurs because of swaying of the lead screw when the lead screw rotates.

DOCUMENT OF RELATED ART

Patent Document (Patent Document 1) Korean Patent No. 10-1725411 (registered on Apr. 11, 2017)

SUMMARY OF THE INVENTION

The present invention has been made in an effort to provide an apparatus for operating a seat, in which two opposite ends of a lead screw are rotatably supported by first and second brackets, thereby preventing noise caused by swaying of the lead screw.

An exemplary embodiment of the present invention provides an apparatus for operating a seat, in which two opposite ends of a lead screw are rotatably supported by first and second brackets in a movable rail.

Support members may be provided in the first and second brackets, and the support members may support the two opposite ends of the lead screw so that the two opposite ends of the lead screw are rotatable.

The support member may be a bearing.

The lead screw may have a threaded portion provided on an outer-diameter portion disposed between the two opposite ends of the lead screw, the threaded portion may be screw-coupled to a lead nut provided in the movable rail and move along a screw inner-diameter portion of the lead nut, and the lead nut may be connected to a stationary rail fixed to a floor panel of a vehicle.

An assembling part may be provided at one end of the lead screw directed toward a gearbox, and the assembling part of the lead screw may be coupled to a worm wheel mounted in the gearbox.

The assembling part of the lead screw may include: a tip portion directed toward the worm wheel and coupled to penetrate an inner-diameter portion of the worm wheel; and an inclined assembling part provided between the tip portion and the threaded portion of the lead screw and having a tapered shape having an outer diameter that increases toward the threaded portion so that the inclined assembling part conforms to the inner-diameter portion of the worm wheel, the inclined assembling part including one or more coupling grooves provided in an outer-diameter portion thereof, and catching end portions provided at a rear end directed toward the threaded portion.

The coupling groove may be inserted into a coupling protrusion provided on an inner-diameter portion of the worm wheel.

An elastic member may be coupled to an assembling groove provided in an outer-diameter portion of the worm wheel and prevents a withdrawal of the lead screw.

Two opposite ends of the elastic member may be spaced apart from each other at an interval so that the elastic member has elasticity, the elastic member may have one or more catching protrusions protruding toward a center thereof, and the catching protrusion may pass through a through-hole of the assembling groove and be assembled to be caught by the catching end portion.

The worm wheel may engage with a worm, and the worm may be provided on an outer-diameter portion of a flexible cable configured to rotate by receiving power of a motor.

The movable rail may be connected to a vehicle seat, and the first and second brackets may be fixed in the movable rail.

According to the present invention, the two opposite ends of the lead screw may be rotatably supported by the first and second brackets, thereby preventing noise caused by swaying of the lead screw.

The present invention may provide the improved structure for assembling the gearbox and the lead screw.

The foregoing summary is illustrative only and is not intended to be in any way limiting. In addition to the illustrative aspects, embodiments, and features described above, further aspects, embodiments, and features will become apparent by reference to the drawings and the following detailed description.

Figure 1:
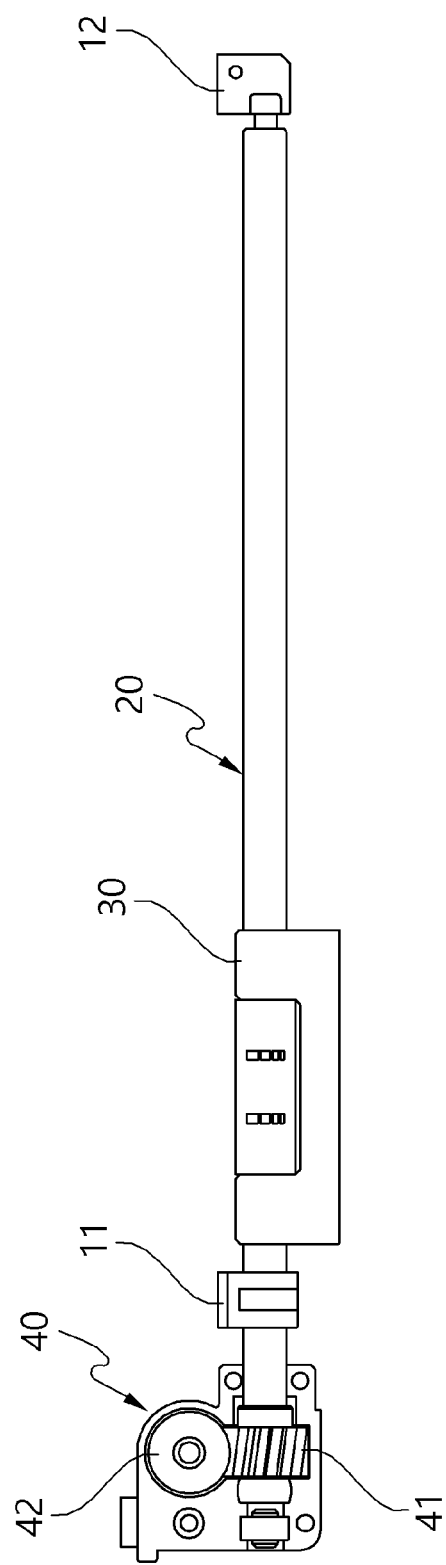
FIG. 1 is a view illustrating an overall structure of an apparatus for operating a seat according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
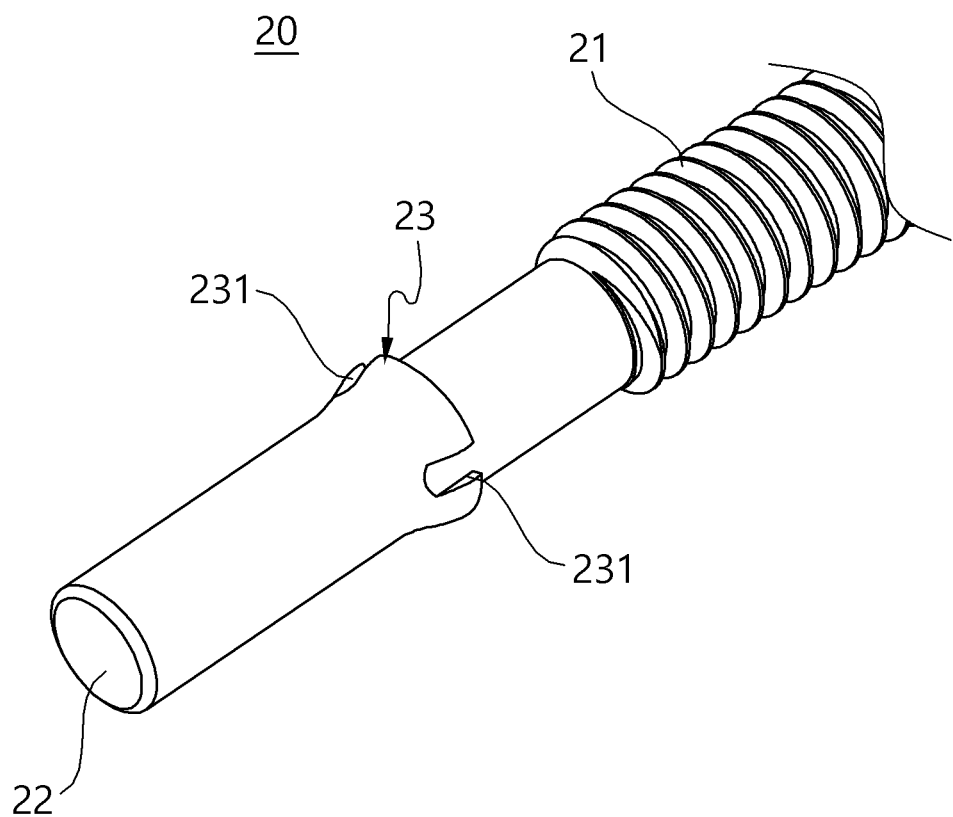
FIG. 2 is a view illustrating an assembling part of a lead screw according to the exemplary embodiment of the present invention.
Figure 3:
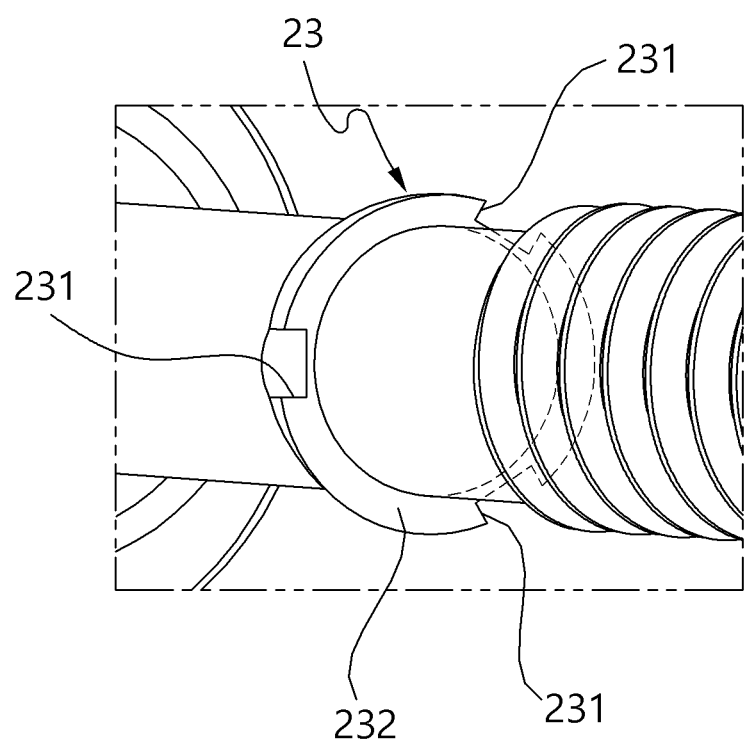
FIG. 3 is a view illustrating a catching end portion of the lead screw according to the exemplary embodiment of the present invention.

FIG. 1 is a view illustrating an overall structure of an apparatus for operating a seat according to an exemplary embodiment of the present invention, FIG. 2 is a view illustrating an assembling part of a lead screw according to the exemplary embodiment of the present invention, and FIG. 3 is a view illustrating a catching end portion of the lead screw according to the exemplary embodiment of the present invention.

As illustrated in FIGS. 1 to 3, the present invention is characterized in that two opposite ends of a lead screw 20 is disposed in a movable rail (not illustrated) and rotatably supported by first and second brackets 11 and 12.

The movable rail (not illustrated) may be connected to a vehicle seat (not illustrated). The first and second brackets 11 and 12 may be fixed in the movable rail.

The first and second brackets 11 and 12 may each have a support member (not illustrated) therein. The support members may support the two opposite ends of the lead screw 20 so that the lead screw 20 is rotatable. For example, the support member may be a bearing.

The lead screw 20 may smoothly rotate in the movable rail in the state in which the two opposite ends of the lead screw 20 are supported by the support members such as bearings.

The lead screw 20 may have a threaded portion 21 provided on an outer-diameter portion disposed between the two opposite ends of the lead screw 20. The threaded portion 21 may be screw-coupled to a lead nut 30 provided in the movable rail.

When power of a motor (not illustrated) is transmitted to the lead screw 20, the lead screw 20 screw-coupled to the lead nut 30 may move forward or rearward along the threaded portion 21 of the lead nut 30.

The lead nut 30 may be connected to a stationary rail (not illustrated) fixed to a floor panel (not illustrated) of a vehicle. Because the lead nut 30 is connected to the stationary rail and stably supports the lead screw 20 as described above, the lead screw 20 may smoothly move forward or rearward.

An assembling part may be provided at one end of the lead screw 20. The assembling part of the lead screw 20 is directed toward a gearbox 40. The assembling part of the lead screw 20 may be coupled to an inner-diameter portion of a worm wheel 41 mounted in the gearbox 40.

As illustrated in FIGS. 2 and 3, the assembling part of the lead screw 20 includes a tip portion 22 and an inclined assembling part 23.

The tip portion 22 may be coupled to penetrate the inner-diameter portion of the worm wheel 41 mounted in the gearbox 40.

The inclined assembling part 23 may be provided between the tip portion 22 and the threaded portion 21 of the lead screw 20. The inclined assembling part 23 may have a tapered shape having an outer diameter that increases toward the threaded portion 21. The inclined assembling part 23 conforms to the inner-diameter portion of the worm wheel 41.

The inclined assembling part 23 includes coupling grooves 231 and catching end portions 232. One or more coupling grooves 231 may be provided along an outer-diameter portion of the inclined assembling part 23.

The catching end portion 232 may be formed at a rear end of the inclined assembling part 23 directed toward the threaded portion 21.

Figure 4:
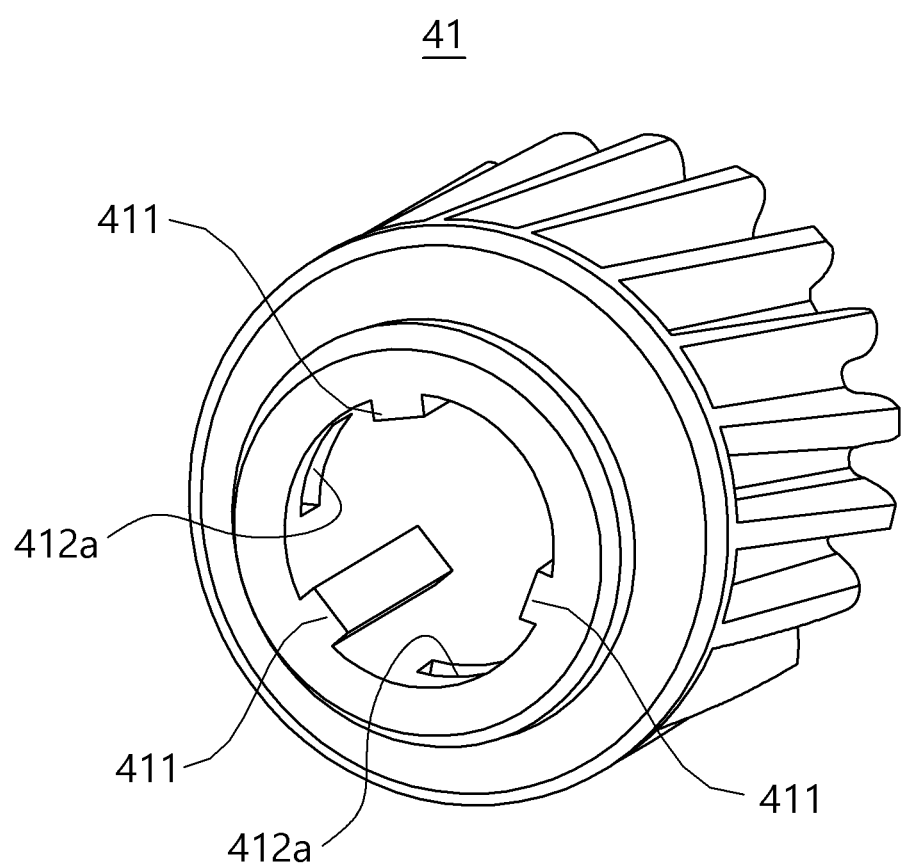
FIG. 4 is a view illustrating a worm wheel according to the exemplary embodiment of the present invention.
Figure 5:
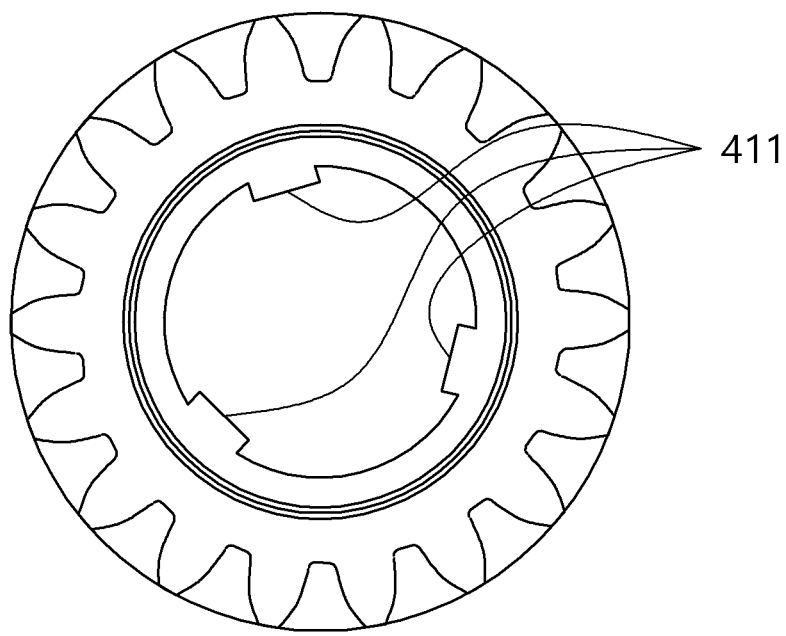
FIG. 5 is a view illustrating a coupling protrusion of the worm wheel according to the exemplary embodiment of the present invention.
Figure 6:
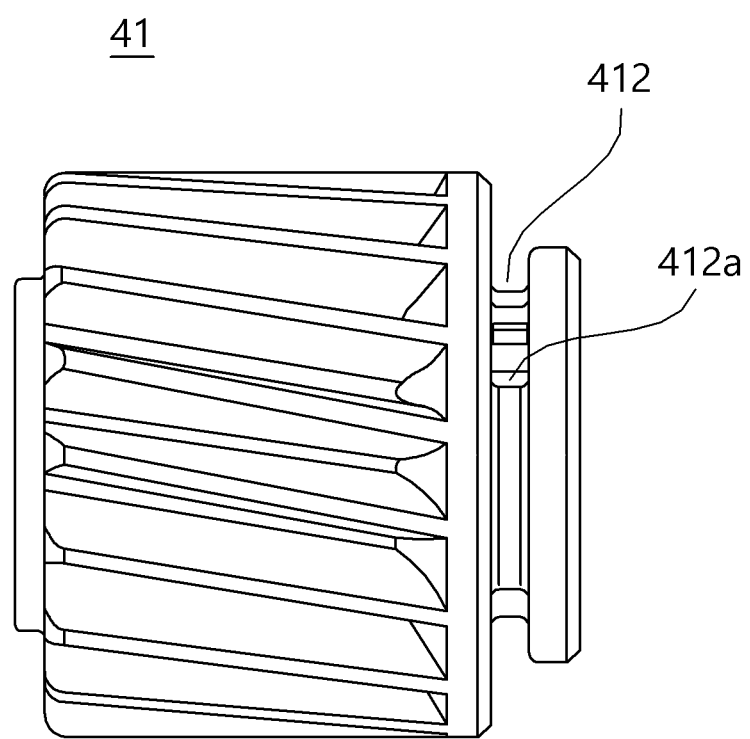
FIG. 6 is a view illustrating an assembling groove of the worm wheel according to the exemplary embodiment of the present invention.

FIG. 4 is a view illustrating the worm wheel according to the exemplary embodiment of the present invention, FIG. 5 is a view illustrating a coupling protrusion of the worm wheel according to the exemplary embodiment of the present invention, and FIG. 6 is a view illustrating an assembling groove of the worm wheel according to the exemplary embodiment of the present invention.

As illustrated in FIGS. 4 to 6, coupling protrusions 411 provided on the inner-diameter portion of the worm wheel 41 may be inserted into the coupling grooves 231. Because the coupling protrusions 411 are inserted into the coupling grooves 231 as described above, the lead screw 20 and the worm wheel 41 may be securely coupled.

Figure 7:
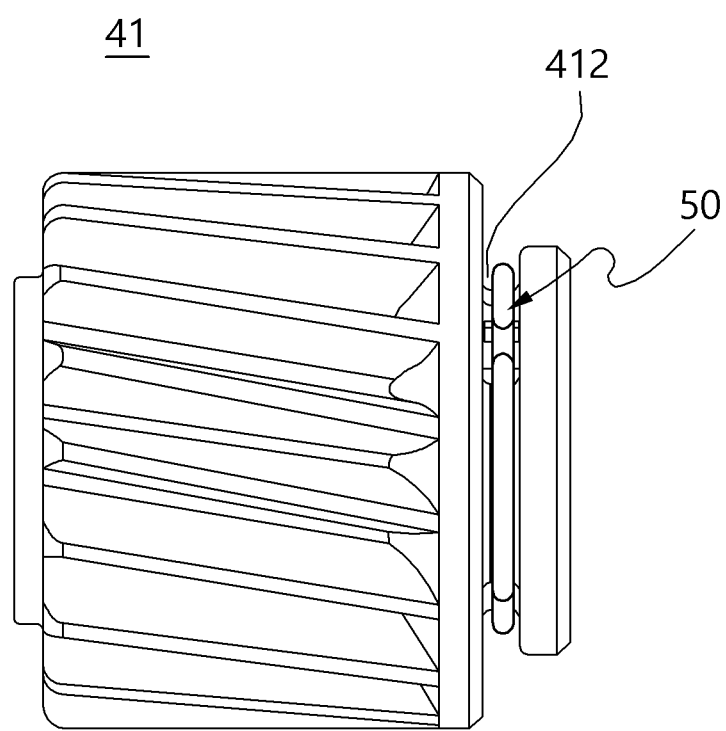
FIG. 7 is a view illustrating a state in which an elastic member is coupled to the assembling groove of the worm wheel according to the exemplary embodiment of the present invention.
Figure 8:
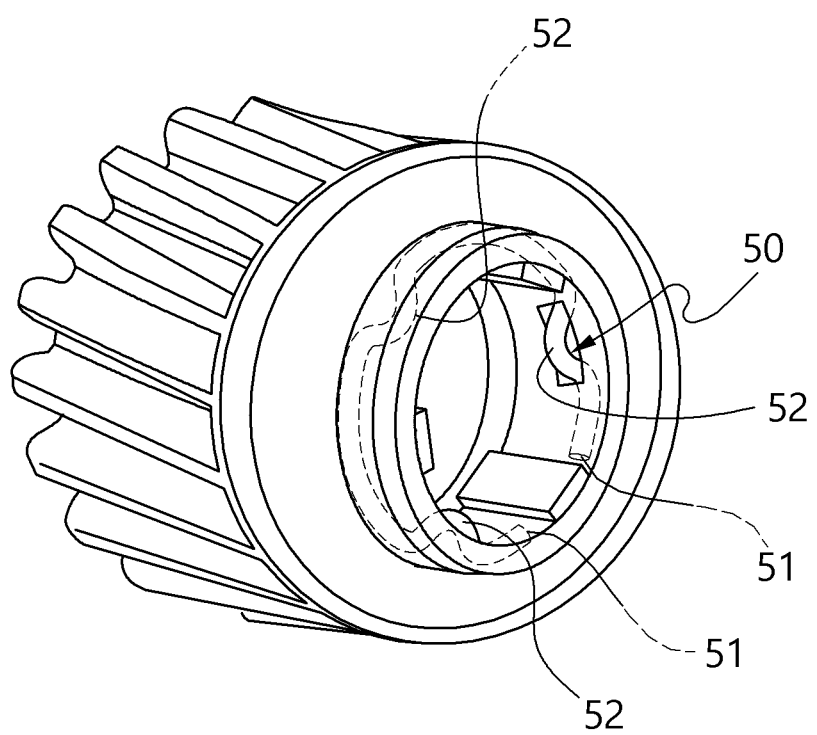
FIG. 8 is a view illustrating the elastic member according to the exemplary embodiment of the present invention.

FIG. 7 is a view illustrating a state in which an elastic member is coupled to the assembling groove of the worm wheel according to the exemplary embodiment of the present invention, and FIG. 8 is a view illustrating the elastic member according to the exemplary embodiment of the present invention.

As illustrated in FIGS. 7 and 8, an elastic member 50 may be coupled to an assembling groove 412 provided in an outer-diameter portion of the worm wheel 41. The elastic member 50 may serve to prevent a withdrawal of the lead screw 20.

As illustrated in FIG. 8, two opposite ends 51 of the elastic member 50 may be spaced apart from each other at an interval so that the elastic member 50 has elasticity. The elastic member 50 may elastically operate while the two opposite ends 51 move toward or away from each other.

Figure 9:
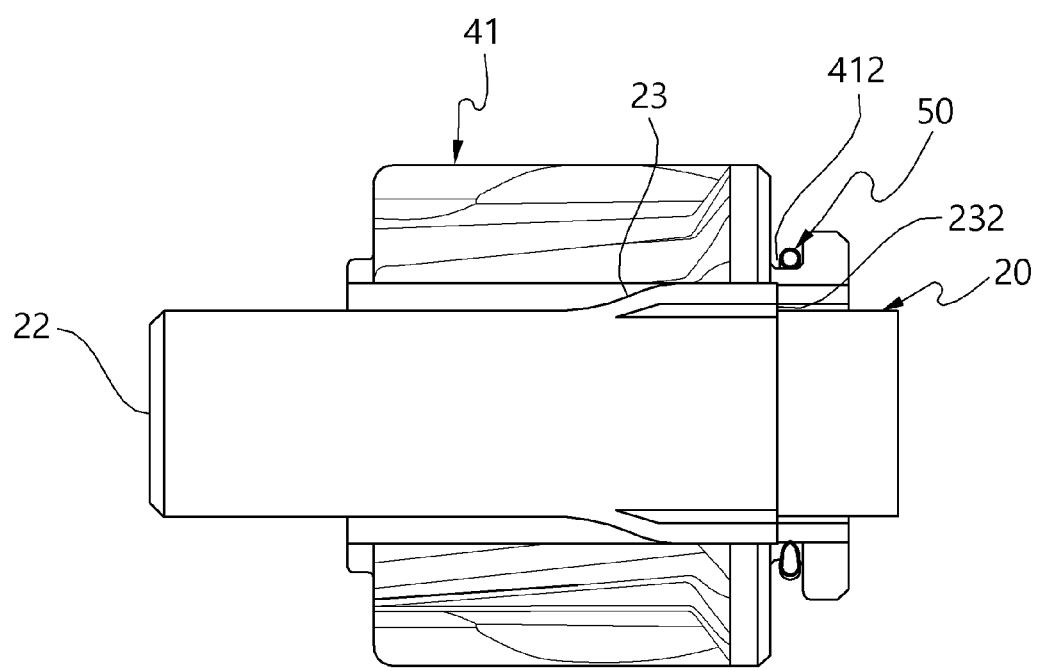
FIG. 9 is a view illustrating a state in which the assembling part of the lead screw according to the exemplary embodiment of the present invention is assembled to the worm wheel.
Figure 10:
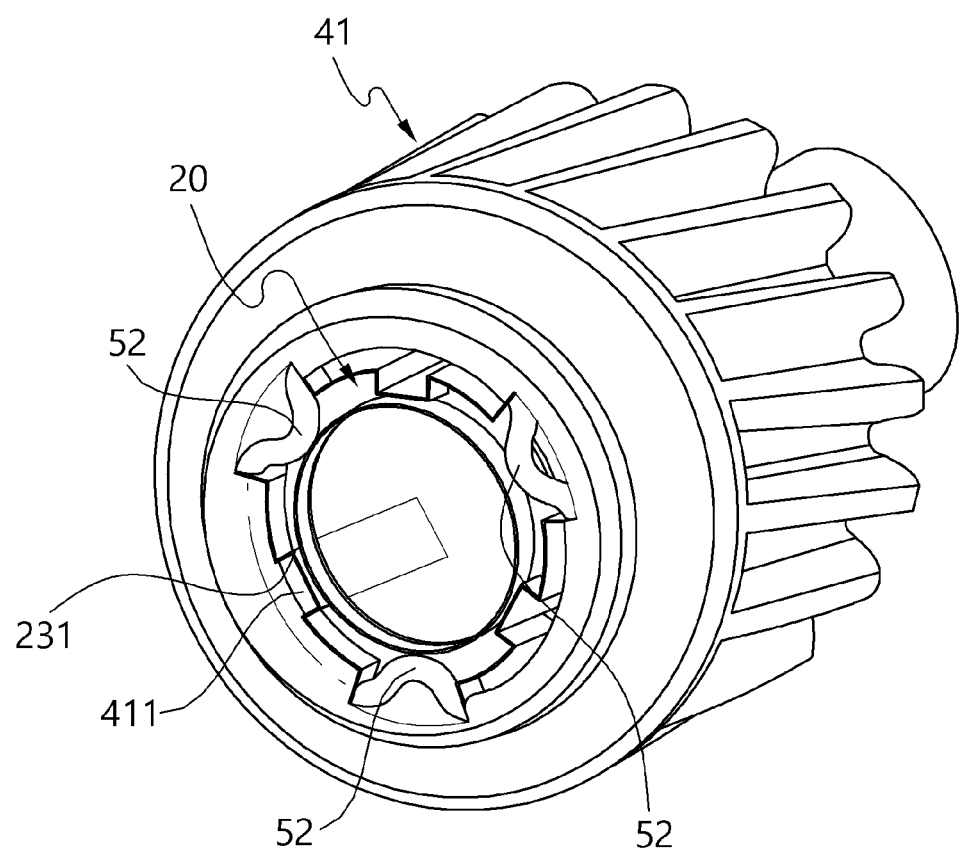
FIG. 10 is a view illustrating a state in which the catching protrusion of the elastic member according to the exemplary embodiment of the present invention is caught by the catching end portion.

FIG. 9 is a view illustrating a state in which the assembling part of the lead screw according to the exemplary embodiment of the present invention is assembled to the worm wheel, and FIG. 10 is a view illustrating a state in which the catching protrusion of the elastic member according to the exemplary embodiment of the present invention is caught by the catching end portion.

As illustrated in FIGS. 9 and 10, the elastic member 50 has catching protrusions 52. One or more catching protrusions 52 may be provided. The catching protrusion 52 may be formed convexly toward a center of the elastic member 50.

When the elastic member 50 is coupled to the assembling grooves 412 of the worm wheel 41, the catching protrusions 52 of the elastic member 50 may pass through through-holes 412a of the assembling groove 412 and be caught by the catching end portions 232 of the lead screw 20.

The two opposite ends 51 may be moved away from each other, such that the elastic member 50 may be easily coupled to the assembling groove 412 of the worm wheel 41. A distance between the two opposite ends 51 may be decreased to an original state when a force, which has been applied to the elastic member 50, is eliminated in the state in which the elastic member 50 is coupled to the assembling groove 412.

The worm wheel 41 may engage with a worm 42. The worm 42 may be provided on an outer-diameter portion of a flexible cable (not illustrated) that is rotated by receiving power of the motor (not illustrated).

Next, an operation of the present invention will be described.

As illustrated in FIG. 1, when power of the motor (not illustrated) is transmitted to the flexible cable (not illustrated), the flexible cable may rotate. The worm 42 connected to the flexible cable may rotate as the flexible cable rotates.

The worm wheel 41, which engages with the worm 42, may rotate as the worm 42 rotates. The lead screw 20 connected to the worm wheel 41 may rotate as the worm wheel 41 rotates.

The lead screw 20 is assembled to the inner-diameter portion of the worm wheel 41 by means of the inclined assembling part 23 via the tapered structure, and the coupling groove 231 of the lead screw 20 is correspondingly coupled to the coupling protrusion 411 of the worm wheel 41. Therefore, when the worm wheel 41 rotates, the worm wheel 41 does not abnormally spin, and a rotational force of the worm wheel 41 may be transmitted to the lead screw 20 in an intact manner.

When the elastic member 50 is coupled to the assembling groove 412 of the worm wheel 41, the catching protrusion 52 is caught by the catching end portion 232 of the lead screw 20, such that the axial withdrawal of the lead screw 20 may be prevented.

Because the two opposite ends of the lead screw 20 are supported by the first and second brackets 11 and 12, the lead screw 20 may be prevented from swaying when the lead screw 20 rotates.

In case that the lead screw is manufactured by insert-injection molding, a length of the lead screw is restricted because of a size of an injection mold. In the present invention, a length of the lead screw 20 may be freely extended by virtue of the assembling structure between the lead screw 20 and the worm wheel 41. Therefore, even when the length of the lead screw 20 is extended, the two opposite ends of the lead screw 20 may be stably supported by the first and second brackets 11 and 12.

When the lead screw 20 moves forward or rearward along the screw inner-diameter portion of the lead nut 30 while rotating, the movable rail may move forward or rearward. The vehicle seat connected to the movable rail may be slid forward or rearward by the operation of the movable rail.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

As described above, the exemplary embodiments have been described and illustrated in the drawings and the specification. The exemplary embodiments were chosen and described in order to explain certain principles of the invention and their practical application, to thereby enable others skilled in the art to make and utilize various exemplary embodiments of the present invention, as well as various alternatives and modifications thereof. As is evident from the foregoing description, certain aspects of the present invention are not limited by the particular details of the examples illustrated herein, and it is therefore contemplated that other modifications and applications, or equivalents thereof, will occur to those skilled in the art. Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. An apparatus for operating a seat, comprising a lead screw,
   wherein two opposite ends of the lead screw are rotatably supported by first and second brackets, the lead screw and the first and second brackets being configured to be disposed in a movable rail,
   wherein the lead screw has a threaded portion disposed on an outer-diameter portion between the two opposite ends of the lead screw, the threaded portion is screw-coupled to a lead nut configured to be disposed in the movable rail to enable the lead screw to move along a screw inner-diameter portion of the lead nut, and the lead nut is configured to be connected to a stationary rail fixed to a floor panel of a vehicle, wherein the lead screw comprises an assembling part disposed at one end of the lead screw to be directed toward a gearbox, and the assembling part of the lead screw is coupled to a worm wheel mounted in the gearbox, wherein the assembling part of the lead screw comprises:

a tip portion directed toward the worm wheel and coupled to penetrate an inner-diameter portion of the worm wheel; and an inclined assembling part disposed between the tip portion and the threaded portion of the lead screw and having a tapered shape having an outer diameter that increases toward the threaded portion such that the inclined assembling part fits with the inner-diameter portion of the worm wheel, the inclined assembling part including one or more coupling grooves defined in an outer-diameter portion thereof, and catching end portions disposed at a rear end thereof directed toward the threaded portion.

2. The apparatus of claim 1, wherein each of the first and second brackets includes a support member, and the support members are configured to support the two opposite ends of the lead screw to enable the two opposite ends of the lead screw to rotate.

3. The apparatus of claim 1, wherein the worm wheel comprises one or more coupling protrusions positioned on the inner-diameter portion thereof, and the one or more coupling protrusions are configured to be inserted into the one or more coupling grooves, respectively.

4. The apparatus of claim 1, wherein the worm wheel comprises an assembling groove defined in an outer-diameter portion thereof, and an elastic member is coupled to the assembling groove to prevent a withdrawal of the lead screw.

5. The apparatus of claim 4, wherein two opposite ends of the elastic member are elastic and spaced apart from each other at an interval to move toward or away from each other, wherein the elastic member has one or more catching protrusions protruding toward a center thereof, and wherein the assembling groove has one or more through-holes, and the one or more catching protrusions are assembled to pass through the one or more through-holes of the assembling groove, respectively, to be caught by at least one of the catching end portions.

6. The apparatus of claim 3, wherein the worm wheel engages with a worm, and the worm is disposed on an outer-diameter portion of a flexible cable configured to rotate by power of a motor.

7. The apparatus of claim 1, wherein the movable rail is connected to a vehicle seat, and the first and second brackets are fixed in the movable rail.

* * * * *